US011617300B2

United States Patent
Noll et al.

(10) Patent No.: US 11,617,300 B2
(45) Date of Patent: Apr. 4, 2023

(54) LOCKING MECHANISM FOR AN AGRICULTURAL HEADER

(71) Applicant: CNH Industrial America LLC, New Holland, PA (US)

(72) Inventors: Blaine Robert Noll, Fleetwood, PA (US); Herbert Max Farley, Elizabethtown, PA (US); Jeffrey Daniel Thomas, Gordonville, PA (US); Benjamin David Kemmerer, Hamburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 616 days.

(21) Appl. No.: 16/725,781

(22) Filed: Dec. 23, 2019

(65) Prior Publication Data

US 2021/0185875 A1 Jun. 24, 2021

(51) Int. Cl.
*A01D 34/04* (2006.01)
*A01D 67/00* (2006.01)
*A01D 41/14* (2006.01)

(52) U.S. Cl.
CPC ............. *A01D 34/04* (2013.01); *A01D 41/14* (2013.01); *A01D 67/00* (2013.01)

(58) Field of Classification Search
CPC ........ A01D 34/04; A01D 41/14; A01D 67/00; A01B 59/064
See application file for complete search history.

(56) References Cited

U.S. PATENT DOCUMENTS

| | | | | | |
|---|---|---|---|---|---|
| 1,451,140 | A | * | 4/1923 | Brown | A01D 34/02 56/15.8 |
| 1,458,367 | A | | 6/1923 | Smith | |
| 2,513,703 | A | * | 7/1950 | Annis | A01D 34/04 56/10.4 |
| 2,915,870 | A | * | 12/1959 | Hume | A01D 57/20 56/208 |
| 3,747,311 | A | * | 7/1973 | DeCoene | A01D 41/141 56/208 |
| 4,573,308 | A | * | 3/1986 | Ehrecke | A01D 41/14 56/15.8 |

(Continued)

FOREIGN PATENT DOCUMENTS

| | | | | |
|---|---|---|---|---|
| EP | 3498071 | A1 * | 6/2019 | ............ A01D 34/24 |
| GB | 1178221 | | 1/1970 | |
| GB | 1237375 | | 6/1971 | |

*Primary Examiner* — Arpad F Kovacs
(74) *Attorney, Agent, or Firm* — Peter Zacharias; Patrick Sheldrake

(57) ABSTRACT

A locking mechanism for an agricultural header includes a rod configured to extend laterally along the agricultural header and a cam coupled to the rod and configured to engage a respective arm of the agricultural header. The arm is configured to support a cutter bar assembly of the agricultural header, and the arm is configured to rotate relative to a frame of the agricultural header. The rod is configured to rotate in a first direction to a first orientation to engage the cam with the arm to block rotation of the arm relative to the frame, and the rod is configured to rotate in a second direction, opposite the first direction, to a second orientation to disengage the cam from the arm to enable rotation of the arm relative to the frame.

20 Claims, 8 Drawing Sheets

(56) References Cited

U.S. PATENT DOCUMENTS

| | | | | |
|---|---|---|---|---|
| 4,599,852 | A * | 7/1986 | Kerber | A01D 41/14 56/15.8 |
| 7,640,720 | B1 * | 1/2010 | Lovett | A01D 57/20 56/153 |
| 7,802,417 | B2 * | 9/2010 | Sauerwein | A01D 41/14 56/181 |
| 7,877,976 | B2 * | 2/2011 | Honas | A01D 41/14 56/208 |
| 7,930,871 | B1 * | 4/2011 | Figgins | A01D 34/283 56/208 |
| 7,937,919 | B2 * | 5/2011 | Goers | A01D 61/002 56/15.8 |
| 7,992,374 | B1 * | 8/2011 | Bich | A01D 41/141 56/208 |
| 8,051,633 | B2 | 11/2011 | Figgins et al. | |
| 8,393,135 | B2 * | 3/2013 | Honas | A01D 41/14 56/181 |
| 8,534,037 | B2 * | 9/2013 | Sauerwein | A01D 57/20 56/153 |
| 8,601,779 | B1 * | 12/2013 | Figgins | A01D 34/283 56/181 |
| 9,148,999 | B2 * | 10/2015 | Fuechtling | A01D 43/06 |
| 11,246,259 | B2 * | 2/2022 | Yanke | A01D 34/283 |
| 11,382,262 | B2 * | 7/2022 | Thomas | A01D 34/283 |
| 2003/0010010 | A1 * | 1/2003 | Buermann | A01D 41/14 56/257 |
| 2003/0074876 | A1 * | 4/2003 | Patterson | A01D 41/144 56/257 |
| 2007/0204585 | A1 * | 9/2007 | Lovett | A01D 61/002 56/15.8 |
| 2009/0277147 | A1 * | 11/2009 | Honas | A01D 41/14 56/208 |
| 2009/0293441 | A1 * | 12/2009 | Sauerwein | A01D 57/20 56/208 |
| 2010/0083629 | A1 * | 4/2010 | Klotzbach | A01D 41/14 56/320.1 |
| 2014/0090345 | A1 * | 4/2014 | Honas | A01D 43/06 56/181 |
| 2018/0228081 | A1 | 8/2018 | Shearer | |
| 2019/0230858 | A1 * | 8/2019 | Shearer | A01D 41/145 |
| 2021/0368675 | A1 * | 12/2021 | Brimeyer | F16H 25/14 |
| 2021/0368681 | A1 * | 12/2021 | Brimeyer | F16D 13/585 |

* cited by examiner

LOCKING MECHANISM FOR AN AGRICULTURAL HEADER

BACKGROUND

The present disclosure relates generally to a locking mechanism for an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain crops that include grain (e.g., barley, corn, flax, oats, rye, wheat, etc.). During operation of a combine, the harvesting process may begin by removing a portion of each crop from a field, such as by using a header. The header may cut the agricultural crops and may transport the cut crops to a processing system of the combine.

Certain headers include a cutter bar assembly configured to cut a portion of each crop (e.g., a stalk), thereby separating the cut crop from the soil. The cutter bar assembly may extend along a substantial portion of the width of the header at a forward end of the header. In addition, the cutter bar assembly may include a blade support, a stationary guard assembly, and a moving blade assembly. The moving blade assembly may be fixed to the blade support, and the blade support/moving blade assembly may be driven to oscillate relative to the stationary guard assembly. The moving blade assembly may include multiple blades distributed along the width of the moving blade assembly, and the stationary guard assembly may include multiple guards distributed along the width of the stationary guard assembly. As the moving blade assembly is driven to oscillate, the blades of the moving blade assembly move relative to the guards of the stationary guard assembly. As the header is moved through the field by the harvester, a portion of a crop (e.g., the stalk) may enter a gap between adjacent guards of the stationary guard assembly and a gap between adjacent blades of the moving blade assembly. Movement of the moving blade assembly causes a blade of the moving blade assembly to move across the gap in the stationary guard assembly, thereby cutting the portion of the crop.

Certain cutter bar assemblies are flexible along the width of the header. Such a cutter bar assembly may be supported by multiple longitudinally extending arms distributed along the width of the header. Each arm may be pivotally mounted to a frame of the header, thereby enabling the cutter bar assembly to flex during operation of the harvester. The flexible cutter bar assembly may follow the contours of the field, thereby enabling the cutting height to be substantially constant along the width of the header. However, if a substantially rigid cutter bar is desired (e.g., for certain field conditions, for harvesting certain types of crops, etc.), the pivoting movement of each arm may be blocked, thereby substantially reducing or eliminating the flexibility of the cutter bar assembly. For example, a pin may be inserted through an opening in an arm and through a corresponding opening in the header frame, thereby blocking pivoting movement of the arm. Unfortunately, the process of aligning the opening of each arm with the corresponding opening in the header frame to facilitate insertion of the pin may be difficult and time consuming. For example, manual lifting of each arm or of the cutter bar assembly such that the openings align may be difficult. As a result, the harvesting process may be significantly delayed if a transition between a flexible cutter bar assembly and a substantially rigid cutter bar assembly is desired, thereby reducing the efficiency of the harvesting process.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a locking mechanism for an agricultural header includes a rod configured to extend laterally along the agricultural header and a cam coupled to the rod and configured to engage a respective arm of the agricultural header. The arm is configured to support a cutter bar assembly of the agricultural header, and the arm is configured to rotate relative to a frame of the agricultural header. The rod is configured to rotate in a first direction to a first orientation to engage the cam with the arm to block rotation of the arm relative to the frame, and the rod is configured to rotate in a second direction, opposite the first direction, to a second orientation to disengage the cam from the arm to enable rotation of the arm relative to the frame.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
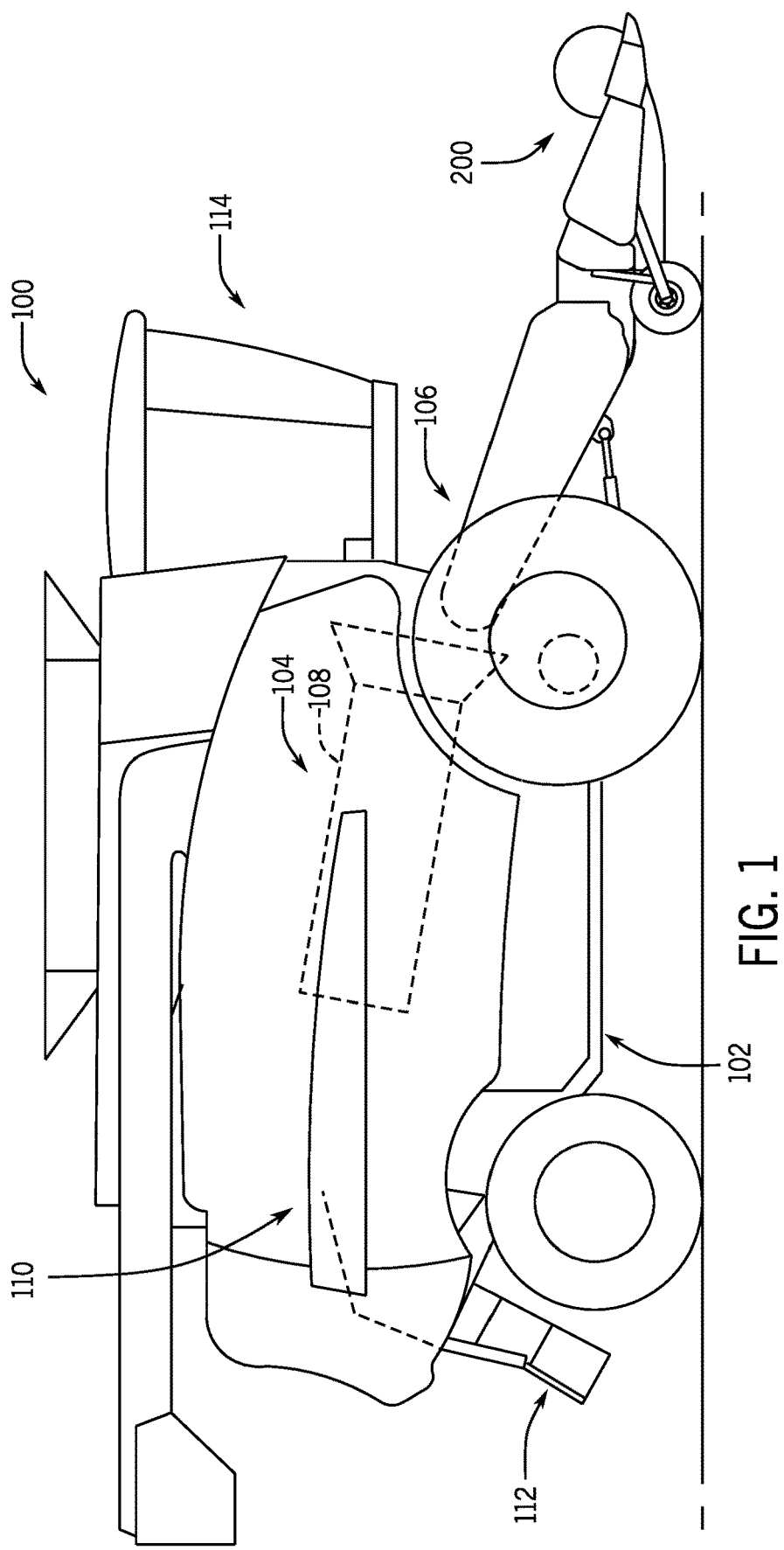
FIG. 1 is a side view of an embodiment of an agricultural harvester having a header, in accordance with an aspect of the present disclosure.

Turning to the drawings, FIG. 1 is a side view of an embodiment of an agricultural harvester 100 having a header 200. The harvester 100 includes a chassis 102 configured to support the header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives the cut crops from the header 200 and separates desired crop material from crop residue. For example, the agricultural crop processing system 104 may include a thresher 108 having a cylindrical threshing rotor that transports the crops in a helical flow path through the harvester 100. In addition to transporting the crops, the thresher 108 may separate certain desired crop material (e.g., grain) from the crop residue, such as husks and pods, and may enable the desired crop material to flow into a cleaning system located beneath the thresher 108. The cleaning system may remove debris from the desired crop material and may transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

In certain embodiments, the header 200 includes a cutter bar assembly configured to cut a portion of each crop (e.g., a stalk), thereby separating the cut crop from the soil. The cutter bar assembly may be flexible laterally along the header 200. The cutter bar assembly may be supported by multiple longitudinally extending arms distributed along the width of the header 200. Each arm may be pivotally mounted to a frame of the header 200, thereby enabling the cutter bar assembly to flex during operation of the harvester 100. The flexible cutter bar assembly may follow the contours of the field, thereby enabling the cutting height to be substantially constant laterally along the header 200. However, if a substantially rigid cutter bar is desired (e.g., for certain field conditions, for harvesting certain types of crops, etc.), the pivoting movement of each arm may be blocked, thereby substantially reducing the flexibility of the cutter bar assembly.

For example, the header 200 may include a locking mechanism configured to transition between a locked state and an unlocked state. The locking mechanism may include a rod disposed along the width of the header and cams extending outwardly from the rod. Each cam may engage a respective arm at an end of the arm opposite an end coupled to the cutter bar assembly. The engagement of the cams with the respective arms blocks movement of the respective arms relative to the header frame, thereby locking the cutter bar assembly in the substantially rigid configuration. In addition, disengagement of the cams from the respective arms enables movement of the respective arms relative to the header frame, thereby enabling the cutter bar assembly to flex. The rod is configured to rotate to engage and disengage the cams with the arms. As such, to transition between the substantially rigid and the flexible cutter bar configurations, the locking mechanism may transition between a locked state with the cams engaged with the arms and the unlocked state with the cams disengaged from the arms via rotation of the rod.

In certain embodiments, the locking mechanism may include a transition arm coupled to the rod and configured to move a pin that is movably coupled to a respective arm. For example, the rod and the transition arm may rotate in a first direction to move the pin from a first pin position to a second pin position and in a second direction, opposite the first direction, to move the pin from the second pin position to the first pin position. In the first pin position, the pin blocks rotation of the arm. In the second pin position, the pin enables rotation of the arm. As such, to transition between the substantially rigid and the flexible cutter bar configurations, the locking mechanism may transition between a locked state with each respective pin in the first pin position and an unlocked state with each respective pin in the second pin position.

As illustrated, the harvester 100 includes a cab 114 configured to house an operator. The cab 114 may include certain controls configured to operate the locking mechanism. For example, the controls within the cab 114 may be mechanically coupled to the rod of the locking mechanism and may be configured to rotate the rod to transition the locking mechanism from the locked state to the unlocked state, and vice versa. In certain embodiments, the controls may include a user interface communicatively coupled to a motor and/or actuator. The motor and/or actuator may be configured to rotate the rod to transition the locking mechanism from the locked state to the unlocked state, and vice versa. The operator may interact with the user interface to cause the motor and/or actuator to rotate the rod to transition the locking mechanism. As such, the operator may operate the locking mechanism while positioned within the cab 114.

Figure 2:
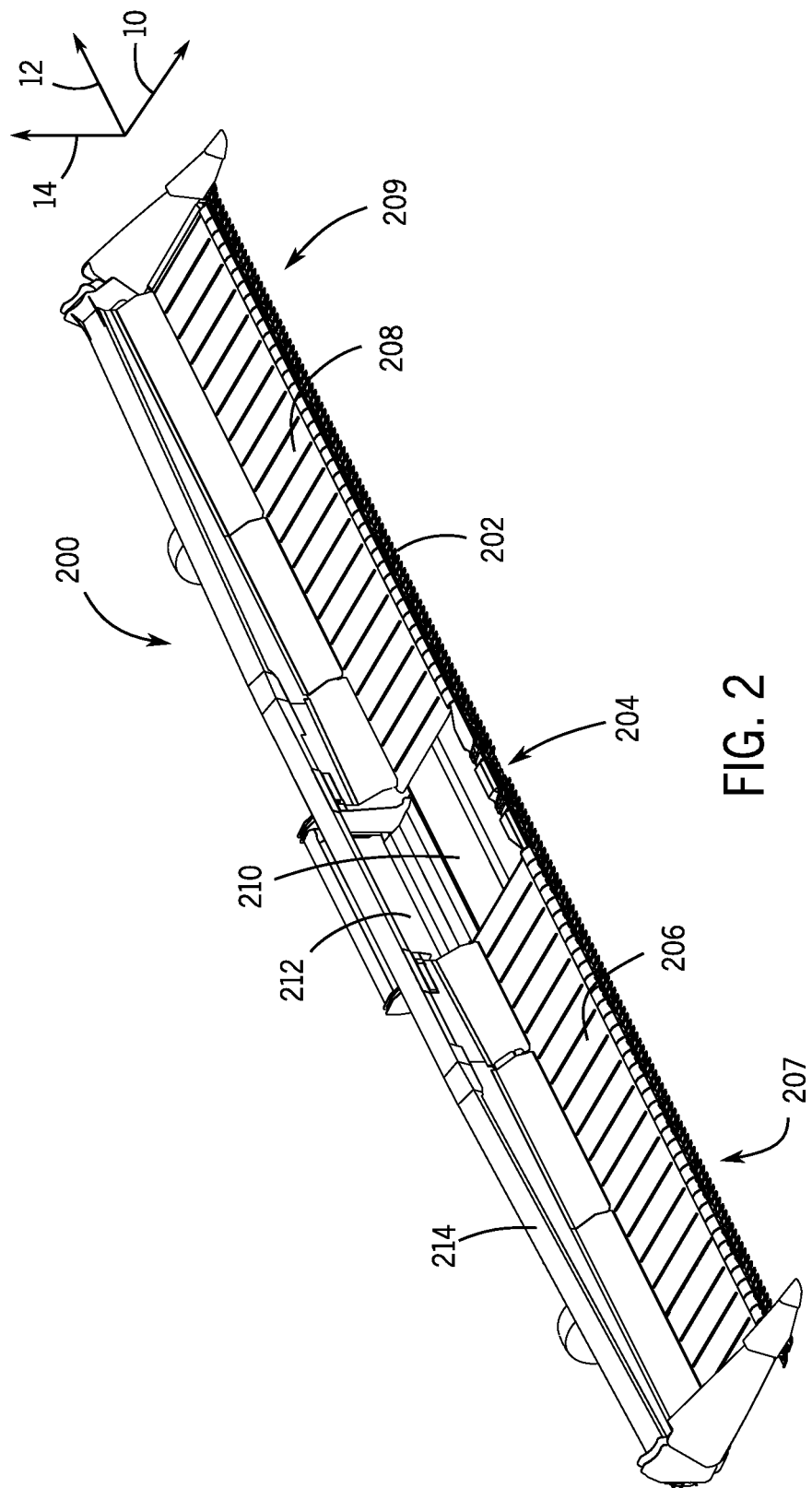
FIG. 2 is a perspective view of an embodiment of a header that may be employed within the agricultural harvester of FIG. 1, in accordance with an aspect of the present disclosure.

FIG. 2 is a perspective view of an embodiment of a header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200. As illustrated, the cutter bar assembly 202 extends along a substantial portion of the width of the header 200 (e.g., the extent of the header 200 along a lateral axis 12). The cutter bar assembly includes a blade support, a stationary guard assembly, and a moving blade assembly. The moving blade assembly is fixed to the blade support (e.g., above the blade support relative to a vertical axis 14 of the header 200), and the blade support/moving blade assembly is driven to oscillate relative to the stationary guard assembly. In the illustrated embodiment, the blade support/moving blade assembly is driven to oscillate by a driving mechanism 204 positioned at the lateral center of the header 200. However, in other embodiments, the blade support/moving blade assembly may be driven by another suitable mechanism (e.g., located at any suitable position on the header). As the harvester is driven through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side 207 of the header 200 and a second lateral belt 208 on a second lateral side 209 of the header 200, opposite the first lateral side 207. Each belt is driven to rotate by a suitable drive mechanism, such as an electric motor or a hydraulic motor. The first lateral belt 206 and the second lateral belt 208 are driven such that the top surface of each belt moves laterally inward along the lateral axis 12. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. In certain embodiments, the first lateral belt, the second lateral belt, the longitudinal belt, or a combination thereof, may be mechanically driven. Additionally, the longitudinal belt 210 is driven such that the top surface of the longitudinal belt 210 moves rearwardly along the longitudinal axis 10. In certain embodiments, the crops cut by the cutter bar assembly 202 are directed toward the belts by a reel assembly. Agricultural crops that contact the top surface of the first lateral belt 206 and the second lateral belt 208 are driven laterally inwardly to the longitudinal belt due to the movement of the lateral belts. In addition, agricultural crops that contact the longitudinal belt 210 and the agricultural crops provided to the longitudinal belt 210 by the first lateral belt 206 and the second lateral belt 208 are driven rearwardly along the longitudinal axis 10 due to the movement of the longitudinal belt 210. Accordingly, the belts move the cut agricultural product through an opening 212 in the header 200 to the inlet of the agricultural crop processing system.

In the illustrated embodiment, the cutter bar assembly 202 is flexible along the width of the header 200 (e.g., the extent of the header 200 along the lateral axis 12). As discussed in detail below, the cutter bar assembly 202 is supported by multiple arms extending along the longitudinal axis 10 and distributed along the width of the header 200 (e.g., along the lateral axis 12 of the header 200). Each arm is mounted to a frame 214 of the header and is configured to rotate about a pivot joint relative to the frame 214. As a result, the cutter bar assembly 202 may flex during operation of the harvester. The flexible cutter bar assembly 202 may follow the contours of the field, thereby enabling the cutting height to be substantially constant along the width of the header 200 (e.g., the extent of the header 200 along the lateral axis 12). However, if a substantially rigid cutter bar assembly 202 is desired (e.g., for certain field conditions, for harvesting certain types of crops, etc.), the pivoting movement of the arms may be blocked by the locking mechanism described herein, thereby substantially reducing the flexibility of the cutter bar assembly 202 (e.g., transitioning the cutter bar assembly to a substantially rigid configuration).

Figure 3:
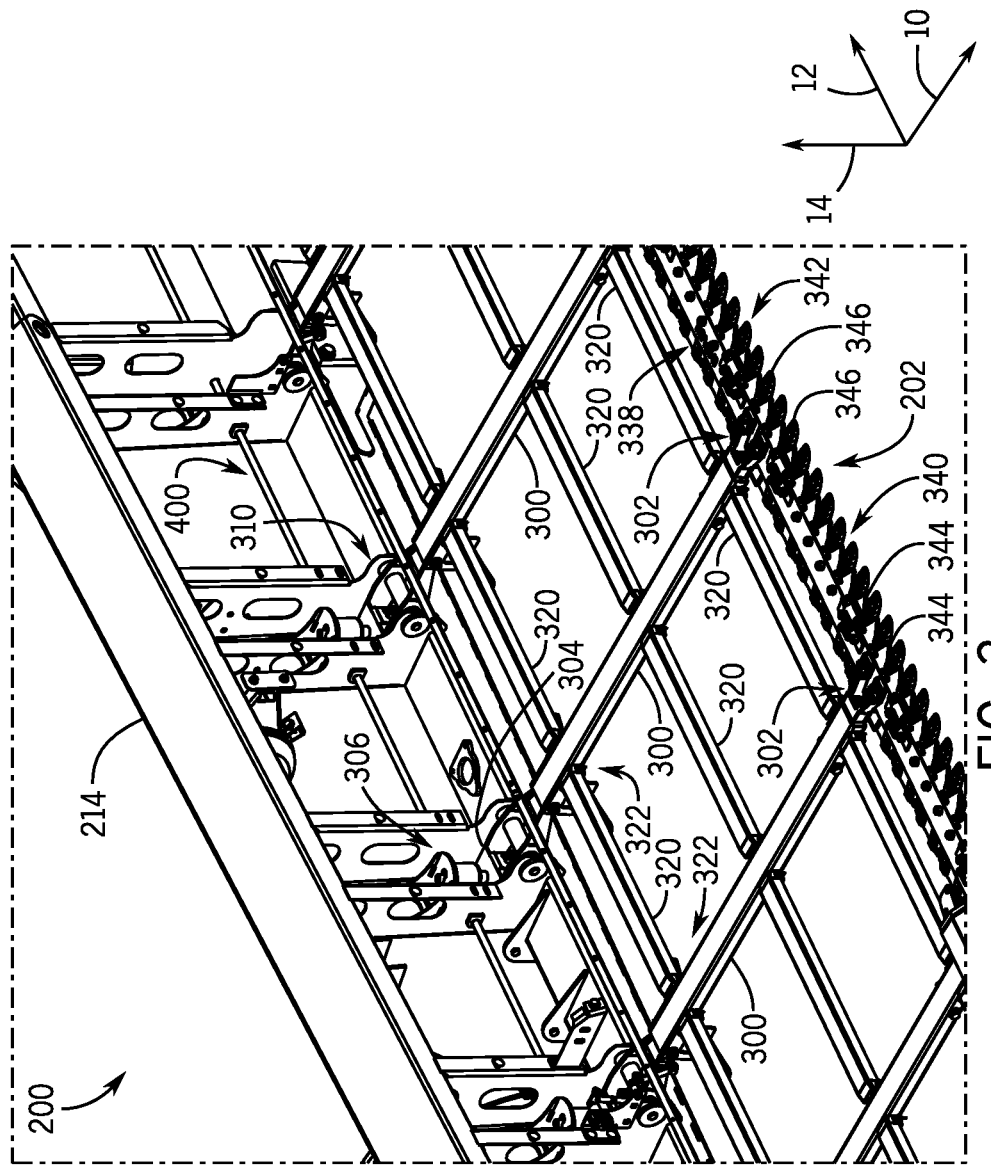
FIG. 3 is a perspective view of a portion of the header of FIG. 2, including a cutter bar assembly, arms that support the cutter bar assembly, and an embodiment of a locking mechanism configured to selectively block rotation of the arms, in accordance with an aspect of the present disclosure.

FIG. 3 is a perspective view of a portion of the header 200 of FIG. 2, including the cutter bar assembly 202 and arms 300 that support the cutter bar assembly 202. As illustrated, the lateral belt (e.g., the first lateral belt or the second lateral belt) and certain panels of the header 200 are omitted from FIG. 3 to better illustrate the arms 300 and certain other portions of the header 200. The arms 300 extend along the longitudinal axis 10 and are distributed along the lateral axis 12. Each arm 300 includes a first end portion 302 coupled to the cutter bar assembly 202 and a second end portion 304 coupled to a hydraulic system 306. Further, each arm 300 is pivotally coupled to the frame 214 of the header 200 at a pivot joint 310 of the arm 300. The pivot joint 310 is located between the first end portion 302 and the second end portion 304. Each arm 300 is configured to pivot about the pivot joint 310 to enable the lateral belt and the cutter bar assembly 202 to flex in response to variations in the terrain. The hydraulic system 306 is configured to urge the first end portion 302 of each arm 300 upwardly to enable the cutter bar assembly 202 to follow the contour of the terrain. The hydraulic system 306 is also configured to absorb energy associated with the arm 300 pivoting. The pivot joint 310 is located significantly closer to the second end portion 304 than the first end portion 302 of each arm 300. As such, a weight of the respective lateral belt, the cutter bar assembly 202, and the arm 300 on the side of the pivot joint 310 adjacent to the cutter bar assembly 202 (e.g., toward the first end portion 302) is significantly greater than a weight of the arm 300 on the side of the pivot joint 310 adjacent to the hydraulic system 306 (e.g., toward the second end portion 304). Due to the weight difference, the second end portion 304 of each arm 300 is biased upwardly toward the hydraulic system 306. In certain embodiments, the header may include other system(s) at the second end portions of the arms (e.g., in place of or in addition to the hydraulic system). For example, a pneumatic system (e.g., an airbag system, a pneumatic cylinder, etc.), a spring, or another suitable mechanism may be coupled to the second end portion of at least one arm and configured to urge the second end portion of the arm downwardly and the first end portion of the arm upwardly. In some embodiments, one or more arms of the header may be coupled to the frame via other systems/mechanisms in addition to or in place of the pivot joints, such as via a leaf spring or another suitable mechanism.

As illustrated, the header 200 includes lateral supports 320 coupled to the arms 300. Each lateral support 320 is coupled to two arms 300 at lateral support ends 322. The arms 300 and the lateral supports 320 may be disposed within and may extend through a respective lateral belt of the header 200. For example, the lateral belt may rotate around the arms 300 and the lateral supports 320 during operation of the header 200. The lateral supports 320 are configured to rotate relative to the arms 300 at the lateral support ends 322 to enable the lateral belt and the cutter bar assembly 202 to flex.

The cutter bar assembly 202 is configured to cut a portion of each crop (e.g., a stalk), thereby separating the crop from the soil. In the illustrated embodiment, the cutter bar assembly 202 includes a blade support 338, a moving blade assembly 340, and a stationary guard assembly 342. The moving blade assembly 340 is coupled to the blade support 338, and the moving blade assembly 340 is driven to oscillate relative to the stationary guard assembly 342. The moving blade assembly 340 includes moving blades 344, and the stationary guard assembly 342 includes stationary guards 346. As the harvester is driven through a field, the moving blades 344 and the stationary guards 346 engage crops within the field as the moving blade assembly 340 oscillates, and the moving blade assembly 340 cuts the crops (e.g., the stalks of the crops) in response to the engagement with the crops. For example, a portion of a crop (e.g., the stalk) may enter a gap between adjacent stationary guards 346 and a gap between adjacent moving blades 344. Movement of the moving blade assembly 340 causes a moving blade 344 to move across the gap in the stationary guard assembly 342, thereby cutting the portion of the crop.

As described herein, the cutter bar assembly 202 is configured to flex. For example, while the header 200 traverses the field, the cutter bar assembly 202 may generally flex to match the contour of the field. The cutter bar assembly 202 may flex while cutting crops. The arms 300 are configured to pivot about the pivot joints 310 to enable the cutter bar assembly 202 to flex. However, in certain situations, an operator may desire the cutter bar assembly 202 to be substantially rigid. As such, the header 200 includes a locking mechanism 400 configured to transition the cutter bar assembly 202 between a flexible configuration and a substantially rigid configuration. In the rigid configuration, the locking mechanism 400 is in a locked state and is configured to block rotation of the arms 300 about the pivot joints 310. By blocking the rotation of the arms 300, the cutter bar assembly 202 is maintained in the substantially rigid configuration.

The locking mechanism 400 is configured to transition to engage the arms 300 of the header 200 to block the arms 300 from rotating and to disengage the arms 300 to enable the arms 300 to rotate. While the locking mechanism 400 is in the locked state, the arms 300 are substantially blocked from rotating about the pivot joints 310, and the cutter bar assembly 202 is in a substantially rigid configuration. While the locking mechanism 400 is in the unlocked state, the arms 300 are not blocked by the locking mechanism 400 and are able to rotate about the respective pivot joints 310. While the locking mechanism 400 is in the unlocked state, the cutter bar assembly 202 is in a flexible configuration.

As illustrated, the locking mechanism 400 is disposed along the lateral axis 12 at a rear portion of the header 200. The locking mechanism 400 may be configured to engage each arm 300 of the header 200 or only a portion of the arms 300. In certain embodiments, the header may include multiple locking mechanisms with each locking mechanism configured to engage different arms of the header. For example, a first locking mechanism may be configured to engage a first arm or a first set of arms (e.g., a set of arms disposed along a section of the header, such as a side deck or an infeed deck), and a second locking mechanism may be configured to engage a second arm or a second set of arms (e.g., a set of arms disposed along another section of the header, such as another side deck or the infeed deck). The header may include one locking mechanism, two locking mechanisms, three locking mechanisms, etc.

Figure 4:
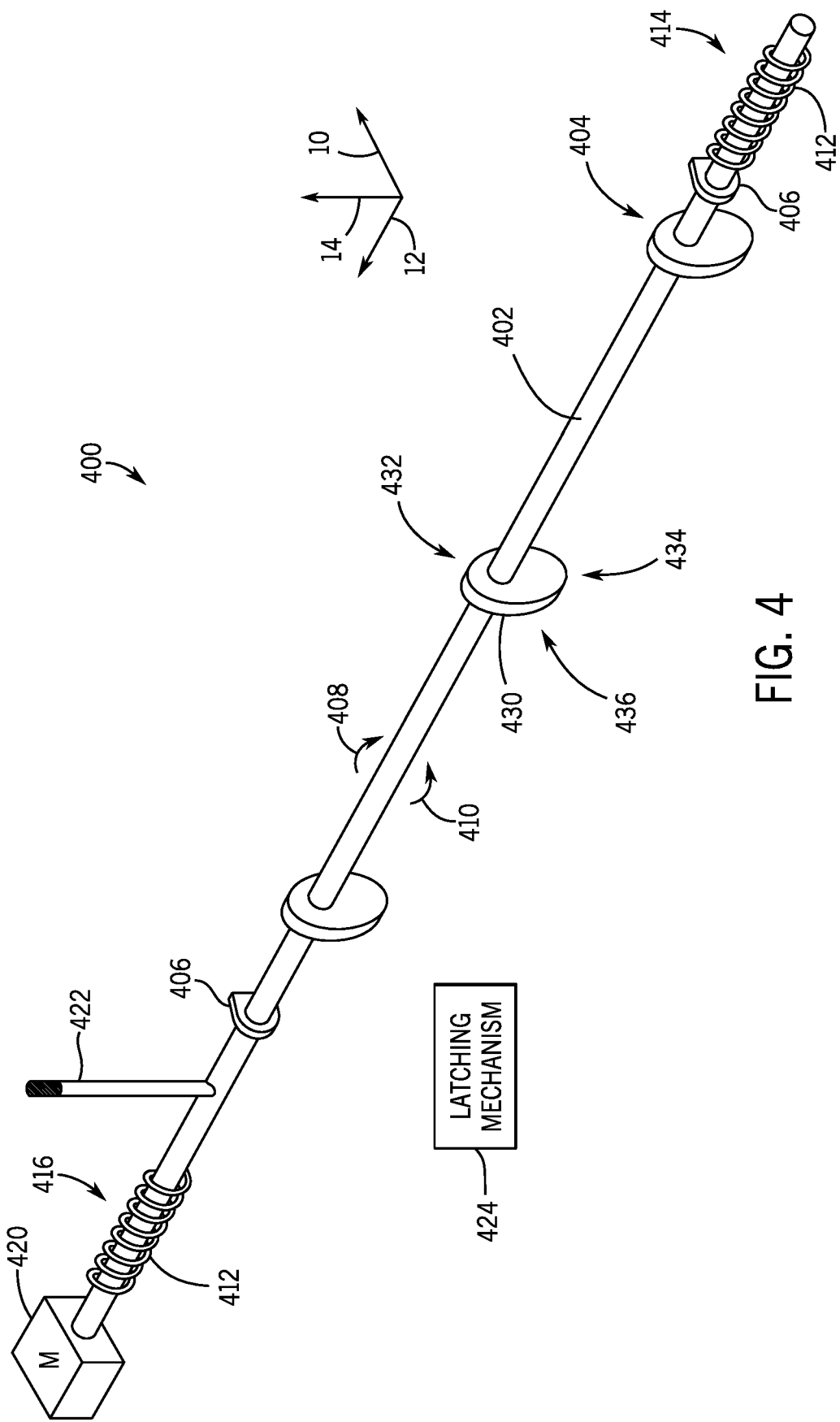
FIG. 4 is a perspective view of the locking mechanism of FIG. 3, in accordance with an aspect of the present disclosure.

FIG. 4 is a perspective view of the locking mechanism 400 of FIG. 3. As illustrated, the locking mechanism 400 includes a rod 402 and cams 404. The rod 402 extends generally along the lateral axis 12. For example, the rod 402 may extend laterally along the header. The cams 404 extend from the rod 402 and are generally perpendicular to the rod 402. As illustrated, the locking mechanism 400 includes mounting brackets 406 that may be rigidly coupled to the frame of the header (e.g., directly to the header frame). The rod 402 is rotatably coupled to the mounting brackets 406. In certain embodiments, the rod may be rotatably coupled to the mounting brackets via a bearing that enables the rod to rotate relative to the brackets. Additionally, the rod 402 is configured to rotate in a first direction 408 (e.g., to a first orientation) to transition the locking mechanism 400 to a locked state and in a second direction 410 (e.g., to a second orientation) to transition the locking mechanism 400 to an unlocked state. The locking mechanism 400 further includes biasing elements 412 disposed generally at a first end portion 414 of the rod 402 and at a second end portion 416 of the rod 402. The biasing elements 412 are configured to bias the rod 402 in the first direction 408 to urge the locking mechanism 400 to toward the locked state. In certain embodiments, the biasing elements 412 may be coupled to the frame of the header. As illustrated, each biasing element 412 is a bi-directional torsion spring. In certain embodiments, at least one biasing element 412 may be a leaf spring, another type of biasing element, or a combination thereof. In some embodiments, the locking mechanism may include more or fewer biasing elements (e.g., one biasing element, three biasing elements, six biasing elements, etc.).

As described in greater detail below, the locking mechanism 400 is configured to selectively transition from the unlocked state to the locked state, and vice versa. As illustrated, the locking mechanism 400 includes a motor 420 and a handle 422. A housing of the motor 420 may be coupled to the frame of the header, and the motor 420 may be controlled by the operator from the cab of the harvester (e.g., via a user interface, a motor controller, etc.). For example, the operator may provide an input to cause the motor 420 to transition the locking mechanism 400 from the unlocked state to the locked state. In response, the motor 420 may rotate the rod 402 in the first direction 408 to cause each cam 404 to rotate to engage a respective arm of the header. As each cam 404 engages the respective arm, the cam 404 substantially blocks rotation of the respective arm about the pivot joint. As a result, the portion of the cutter bar assembly coupled to the respective arm is blocked from moving/flexing. The biasing elements 412 are configured to urge the cams 404 toward engagement with the arms to cause the cams 404 to remain engaged with the arms (e.g., even while the motor 420 is not applying torque to the rod), thereby maintaining the cutter bar assembly in the substantially rigid configuration. In certain embodiments (e.g., embodiments in which the biasing elements are omitted), the motor 420 may hold the locking mechanism in the locked state by applying torque to the rod in the first direction. Further, in some embodiments, the motor 420 may be a linear motor coupled to the rod 402 via a linkage and configured to transition the locking mechanism 400 from the locked state to the unlocked state, and vice versa.

The handle 422 enables the operator to rotate the rod 402 locally at the header. The operator may be positioned adjacent to the locking mechanism 400 and may rotate the rod 402 via the handle 422. The rotation of the rod 402 may transition the locking mechanism 400 between the locked state and the unlocked state. For example, the operator may rotate the rod 402, via the handle 422, in the second direction 410 to transition the locking mechanism 400 from the locked state to the unlocked state. In certain embodiments, the motor 420 and/or the handle 422 may include a spring (e.g., a torsion spring) that biases the locking mechanism generally in the second direction 410, such as between the motor 420 and the rod 402 and/or between the handle 422 and the rod 402.

The rod 402 may rotate in the second direction 410 (e.g., to the second orientation) to cause each cam 404 to disengage the respective arm of the header. Once each cam 404 is disengaged from the respective arm, the respective arm may rotate about the pivot joint. The portion of the cutter bar assembly coupled to the respective arm may then flex. For example, the motor 420 may rotate the rod 402 in the second direction 410 to transition the locking mechanism 400 from the locked state to the unlocked state. Additionally, the operator may rotate the rod 402, via the handle 422, in the second direction 410 to transition the locking mechanism 400 from the locked state to the unlocked state. In certain embodiments, either the motor 420 or the handle 422 may be omitted from the locking mechanism 400.

As illustrated, the locking mechanism 400 includes a latching mechanism 424 that may be coupled to the header frame. The latching mechanism 424 is configured to engage the rod 402, at least one cam 404, the handle 422, or a combination thereof, to hold the locking mechanism 400 in the unlocked state against the force provided by the biasing elements 412. For example, after the locking mechanism 400 is transitioned to the unlocked state (e.g., the rod 402 is rotated in the second direction 410 to the second orientation, and the cams 404 disengage from the arms of the header), the latching mechanism 424 may engage the rod 402, the at least one cam 404, the handle 422, or the combination thereof, to hold the locking mechanism 400 in the unlocked state (e.g., to selectively block rotation of the rod 402 while the rod 402 is in the second orientation). The latching mechanism 424 may automatically capture the engagement element(s) (e.g., the rod 402, the at least one cam 404, the handle 422, etc.) of the locking mechanism 400 as the engagement element(s) engage the latching mechanism 424. To transition the locking mechanism 400 from the unlocked state to the locked state, the latching mechanism 424 may disengage the engagement element(s) of the locking mechanism 400. After the latching mechanism 424 is disengaged, the biasing elements 412 may drive the rod 402 to rotate in the first direction 408 to transition the locking mechanism 400 toward the locked state, and/or the motor 420 or the handle 422 may drive the rod 402 to rotate to transition the locking mechanism 400 to the locked state. The operator may remotely disengage the latching mechanism 424 from the cab (e.g., via a user interface communicatively coupled to a latching mechanism disengagement actuator, via a cable, etc.), and/or the operator may locally disengage the latching mechanism 424 from a position adjacent to the header (e.g., via a release, via a lever, etc.).

As illustrated, each cam 404 includes a curved surface 430 (e.g., a curved edge) configured to slidably engage and/or move along a respective arm of the header. The curved surface 430, and the cam 404 generally, includes a first end portion 432 coupled to the rod 402, a second end portion 434 disposed opposite the first end portion 432, and a side portion 436 disposed between the first end portion 432 and the second end portion 434. As the rod 402 rotates, the curved surface 430 may move along the arm of the header. For example, the second end portion 434 may engage the arm while the locking mechanism 400 is in the locked state, thereby blocking rotation of the arm. As the rod 402 rotates in the second direction 410, the curved surface 430 moves along the arm until the cam 404 no longer contacts the arm. In the unlocked state, the side portion 436 is disposed opposite and apart (e.g., disengaged) from the arm, thereby enabling the arm to rotate. In certain embodiments, while the locking mechanism 400 is in the unlocked state, the arm may contact the side portion 436 to establish an end of a rotational range of motion of the arm. In some embodiments, while the locking mechanism 400 is in the unlocked state, the hydraulic system coupled to the arm may block the arm from contacting the side portion 436.

In certain embodiments, the locking mechanism may include multiple rods, with each rod coupled to a number of cams (e.g., one cam, two cams, three cams, etc.). Each rod may independently rotate to engage respective cams with respective arms of the header. For example, each rod may be coupled to a single cam to control movement of a single arm of the header.

Figure 5:
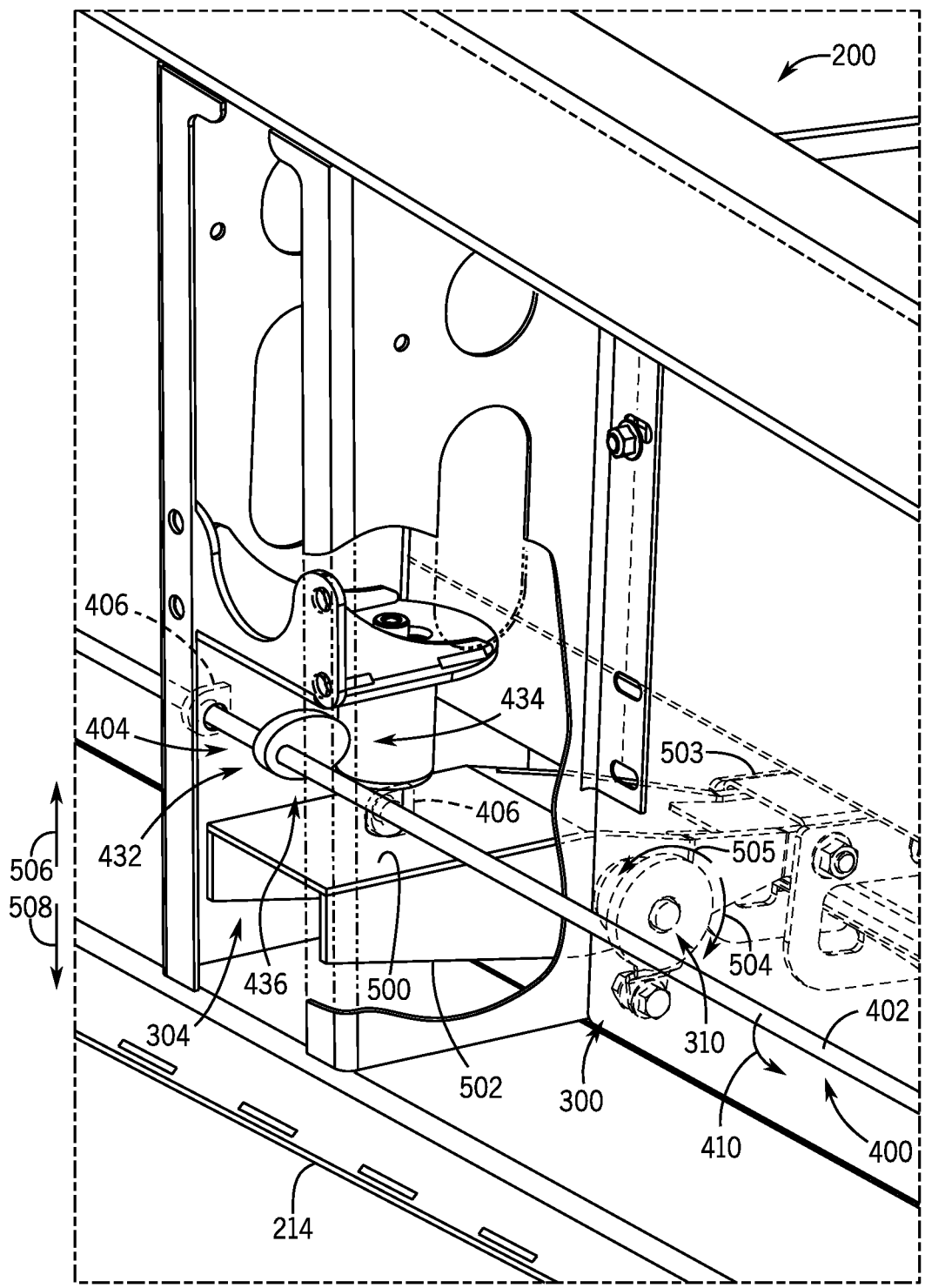
FIG. 5 is a rear perspective view of a portion of the header of FIG. 2, in which the locking mechanism of FIG. 3 is in an unlocked state, in accordance with an aspect of the present disclosure.

FIG. 5 is a rear perspective view of a portion of the header of FIG. 3, in which the locking mechanism 400 is in an unlocked state. As illustrated, the locking mechanism 400 is mounted to the frame 214 via the mounting brackets 406. With the locking mechanism 400 in the illustrated unlocked state, each cam 404 is disengaged from the respective arm 300. As illustrated, the arm 300 includes a plate 500 and a forked member 502 at the second end portion 304 of the arm 300. The plate 500 is rigidly coupled to the forked member 502, the forked member 502 is rigidly coupled to an arm bar 503 of the arm 300, and the cutter bar assembly is coupled to the arm bar 503 (e.g., at the first end portion of the arm 300). In certain embodiments, the plate and/or the forked member may be omitted with a portion of the arm still configured to contact the cam of the locking mechanism.

As described herein, the arm 300 is configured to rotate about the pivot joint 310 in a first rotational direction 504 and in a second rotational direction 505. As the arm 300 rotates about the pivot joint 310, the second end portion 304 of the arm 300 moves upwardly in an upward direction 506 and downwardly in a downward direction 508. Additionally, as the arm 300 rotates, the cutter bar assembly coupled to the first end portion of the arm 300 moves/flexes. For example, as the second end portion 304 of the arm 300 moves upwardly in the upward direction 506 (e.g., as the arm 300 rotates in the first rotational direction 504), the first end portion of the arm 300 and the portion of the cutter bar assembly coupled to the arm 300 move downwardly. As the second end portion 304 of the arm 300 moves downwardly in the downward direction 508 (e.g., as the arm 300 rotates in the second rotational direction 505), the first end portion of the arm 300 and the portion of the cutter bar assembly coupled to the arm 300 move upwardly. The cam 404 (e.g., the second end portion 434 of the cam 404) of the locking mechanism 400 is configured to engage the plate 500 to block rotation of the arm 300 about the pivot joint 310 and to hold the cutter bar assembly in the substantially rigid configuration. However, as illustrated, the locking mechanism is in the unlocked state, so the cam 404 is disengaged from the plate 500. As illustrated, the side portion 436 of the cam 404 is disposed opposite and apart from the plate 500, thereby disengaging the cam 404 from the arm 300 and enabling the arm 300 to rotate. As a result, at least the portion of the cutter bar assembly coupled to the arm 300 may flex. The latching mechanism of the locking mechanism 400 is configured to maintain the locking mechanism 400 in the unlocked state. While the cam 404 is disengaged from the arm 300, the hydraulic system of the header may at least partially control rotation of the arm.

Figure 6:
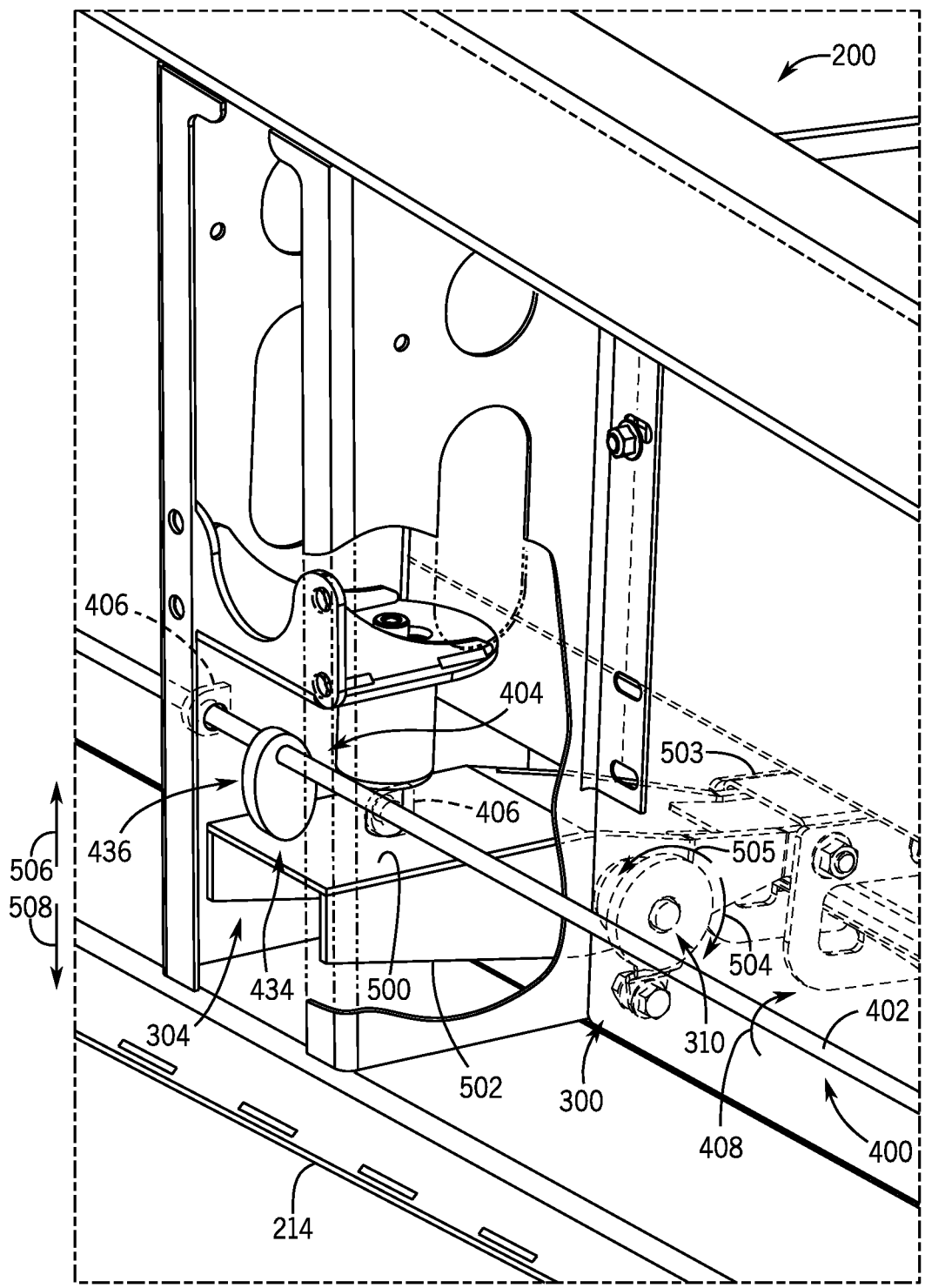
FIG. 6 is a rear perspective view of a portion of the header of FIG. 2, in which the locking mechanism of FIG. 3 is in a locked state, in accordance with an aspect of the present disclosure.

FIG. 6 is a rear perspective view of a portion of the header 200 of FIG. 2, in which the locking mechanism 400 is in a locked state. With the locking mechanism 400 in the illustrated locked state, the cam 404 is engaged with the arm 300 (e.g., the second end portion 434 of the cam 404 is engaged with the plate 500 of the arm 300). As a result, the arm 300 is blocked from rotating about the pivot joint 310 in the first rotational direction 504, and the second end portion 304 of the arm 300 is blocked from moving upwardly in the upward direction 506. For example, after the header or a portion of the header is raised (e.g., raised off a surface on which the header may rest, such as a surface on which the agricultural harvester is positioned), a weight of the respective lateral belt, the cutter bar assembly, and the arm 300 on the side of the pivot joint 310 adjacent to the cutter bar assembly (e.g., toward the first end portion of the arm 300) is significantly greater than a weight of the arm 300 on the side of the pivot joint 310 adjacent to the locking mechanism 400 (e.g., toward the second end portion 304 of the arm 300), thereby biasing the second end portion 304 upwardly in the upward direction 506. As such, the plate 500 is urged upwardly against the cam 404, and the cam 404 blocks the arm 300 from rotating further in the upward direction 506. Accordingly, the locking mechanism 400 blocks rotation of the arm 300 while the locking mechanism 400 is in the illustrated locked state. With each rotation of each arm 300 blocked by the locking mechanism 400, the cutter bar assembly is substantially rigidly held in place and is substantially blocked from flexing, thereby placing the cutter bar assembly in the substantially rigid configuration. In certain embodiments, the locking mechanism may include a stop mechanism (e.g., a cam, a pin, etc.) that blocks movement of the second end of the arm downwardly, such as when the first end of the arm moves upwardly. For example, the locking mechanism may include the cam that blocks upward movement of the second end of the arm and the stop mechanism positioned generally below the second end of the arm that blocks downward movement of the second end of the arm, thereby placing the cutter bar assembly in the substantially rigid configuration.

When the flexible configuration of the cutter bar assembly is desired, the operator may transition the locking mechanism 400 from the illustrated locked state to the unlocked state of FIG. 5. Accordingly, the rod 402 is rotated to disengage the cams 404 from the arms 300, which returns the cutter bar assembly to the flexible configuration.

Figure 7:
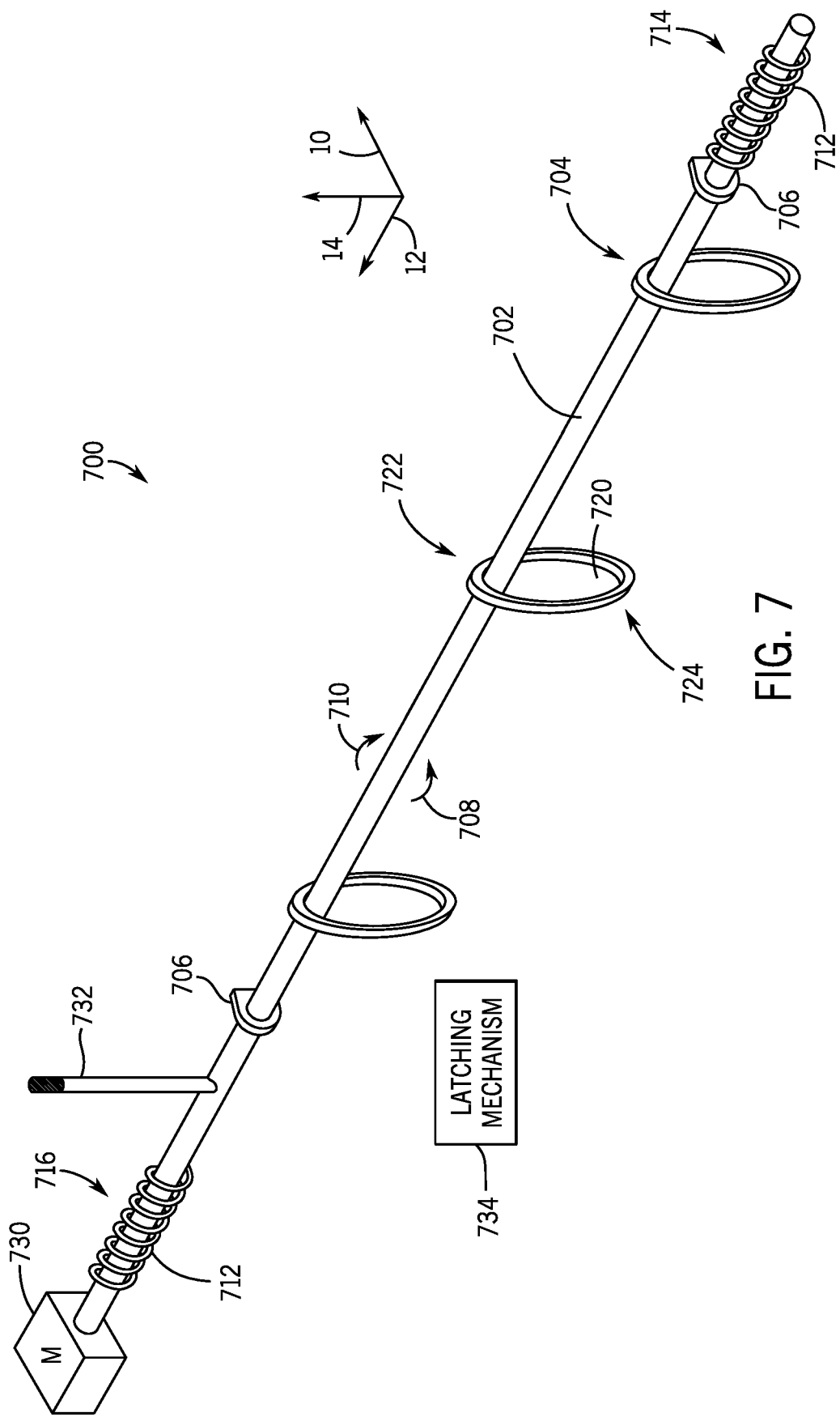
FIG. 7 is a perspective view of another embodiment of a locking mechanism that may be employed in the header of FIG. 2, in accordance with an aspect of the present disclosure.

FIG. 7 is a perspective view of a locking mechanism 700 that may be employed in the header of FIG. 2. As illustrated, the locking mechanism 700 includes a rod 702 and transition arms 704 coupled to the rod 702. The rod 702 extends generally along the lateral axis 12. For example, the rod 702 may extend laterally along the header. The transition arms 704 extend from the rod 702 and are generally perpendicular to the rod 702. As illustrated, the locking mechanism 700 includes mounting brackets 706 that may be rigidly coupled to the frame of the header (e.g., directly to the header frame). The rod 702 is rotatably coupled to the mounting brackets 706. In certain embodiments, the rod may be rotatably coupled to the mounting brackets via a bearing that enables the rod to rotate relative to the brackets. Additionally, the rod 702 is configured to rotate in a first direction 708 (e.g., to a first orientation) to transition the locking mechanism 700 to a locked state and in a second direction 710 (e.g., to a second orientation) to transition the locking mechanism 700 to an unlocked state. The locking mechanism 700 further includes biasing elements 712 disposed generally at a first end portion 714 of the rod 702 and at a second end portion 716 of the rod 702. The biasing elements 712 are configured to bias the rod 702 in the first direction 708 to urge the locking mechanism 700 to toward the locked state. In certain embodiments, the biasing elements 712 may be coupled to the frame of the header. As illustrated, each biasing element 712 is a bi-directional torsion spring. In certain embodiments, at least one biasing element 712 may be a leaf spring, another type of biasing element, or a combination thereof. In some embodiments, the locking mechanism may include more or fewer biasing elements (e.g., one biasing element, three biasing elements, six biasing elements, etc.), or the biasing elements may be omitted from the locking mechanism. As described in greater detail below, a motor of the locking mechanism may be configured to bias the rod in the first direction in an embodiment of the locking mechanism with the biasing elements omitted.

As described in greater detail below, the locking mechanism 700 is configured to selectively transition from the unlocked state to the locked state, and vice versa. In the illustrated embodiment, each transition arm 704 has a slot 720 configured to receive and/or engage a linkage assembly of the header that is moveably coupled to the arm and/or other element(s) of the header. The rod 702 extends through the slot 720 of the transition arm 704 at a first end portion 722 (e.g., a first/upper half) of the transition arm 704. In certain embodiments, the rod may not extend through the slot of the transition arm or may extend partially into the slot of the transition arm. Additionally, the rod 702 is rigidly coupled to the transition arm 704 at the first end portion 722. The transition arm 704 is configured to receive and/or engage the linkage assembly that is moveably coupled to the arm of the header at a second end portion 724 (e.g., a second/lower half) of the transition arm 704. For example, as the rod 702 and the transition arm 704 rotate in the first direction 708, the linkage assembly may be driven to move forward along the longitudinal axis 10 at the second end portion 724. As described in greater detail below, the rotation of the transition arm 704 in the first direction 708 drives the linkage assembly to urge a pin coupled to the linkage assembly from a second pin position, in which the locking mechanism 700 is in the unlocked state, to a first pin position, in which the locking mechanism 700 is in the locked state. With the pin in the first pin position, the pin substantially blocks rotation of a respective arm of the header about the pivot joint. As a result, the portion of the cutter bar assembly coupled to the respective arm is blocked from moving/flexing. The biasing elements 712 are configured to urge the transition arms 704 in the first direction 708 to urge each pin toward the first pin position.

Additionally, as the rod 702 and the transition arm 704 rotate in the second direction 710 (e.g., to the second orientation), the linkage assembly may move rearwardly along the longitudinal axis 10 at the second end portion 724. The rotation of the transition arm 704 in the second direction 710 drives the linkage assembly to urge the pin from the first pin position to the second pin position, thereby transitioning the locking mechanism 700 from the locked state to the unlocked state. With the pin in the second pin position, the respective arm may rotate about the pivot joint, thereby enabling the portion of the cutter bar assembly coupled to the respective arm to move/flex.

As illustrated, the locking mechanism 700 includes a motor 730 and a handle 732. A housing of the motor 730 may be coupled to the frame of the header, and the motor 730 may be controlled by the operator from the cab of the harvester (e.g., via a user interface, a motor controller, etc.). For example, the operator may provide an input to cause the motor 730 to transition the locking mechanism 700 from the unlocked state to the locked state. In response, the motor 730 may rotate the rod 702 in the first direction 708 to cause each transition arm 704 to rotate to urge the pin (e.g., the pin moveably coupled to the arm of the header) from the second pin position to the first pin position. As a result, the portion of the cutter bar assembly coupled to the respective arm is blocked from moving/flexing. In certain embodiments (e.g., embodiments in which the biasing elements 712 are omitted), the motor 730 may hold the locking mechanism 700 in the locked state by applying torque to the rod in the first direction 708. Further, in some embodiments, the motor 730 may be a linear motor coupled to the rod 702 via a linkage and configured to transition the locking mechanism 700 from the locked state to the unlocked state, and vice versa.

The handle 732 enables the operator to rotate the rod 702 locally at the header. The operator may be positioned adjacent to the locking mechanism 700 and may rotate the rod 702 via the handle 732. The rotation of the rod 702 may transition the locking mechanism 700 between the locked state and the unlocked state. For example, the operator may rotate the rod 702, via the handle 732, in the second direction 710 to transition the locking mechanism from the locked state to the unlocked state. In certain embodiments, the motor 730 and/or the handle 732 may include a spring (e.g., a torsion spring) that biases the locking mechanism generally in the second direction 710, such as between the motor 730 and the rod 702 and/or between the handle 732 and the rod 702. In certain embodiments, either the motor 730 or the handle 732 may be omitted from the locking mechanism 700.

As illustrated, the locking mechanism 700 includes a latching mechanism 734 that may be coupled to the header frame. The latching mechanism 734 is configured to engage the rod 702, at least one transition arm 704, the handle 732, or a combination thereof, to hold the locking mechanism 700 in the unlocked state against the force provided by the biasing elements 712. For example, after the locking mechanism 700 is transitioned to the unlocked state (e.g., the rod 702 is rotated in the second direction 710 to the second orientation, and the transition arms 704 urge the pins to the second pin position corresponding to the unlocked state), the latching mechanism 734 may engage the rod 702, the at least one transition arm 704, the handle 732, or the combination thereof, to hold the locking mechanism 700 in the unlocked state (e.g., to selectively block rotation of the rod 702 while the rod 702 is in the second orientation). The latching mechanism 734 may automatically capture the engagement element(s) (e.g., the rod 702, the at least one transition arm 704, the handle 732, etc.) of the locking mechanism 700 as the engagement element(s) engage the latching mechanism 734. To transition the locking mechanism 700 from the unlocked state to the locked state, the latching mechanism 734 may disengage the engagement element(s) of the locking mechanism 700. After the latching mechanism 734 is disengaged, the biasing elements 712 may drive the rod 702 to rotate in the first direction 708 to transition the locking mechanism 700 toward the locked state, and/or the motor 730 or the handle 732 may drive the rod 702 to rotate to transition the locking mechanism 700 to the locked state. The operator may remotely disengage the latching mechanism 734 from the cab (e.g., via a user interface communicatively coupled to a latching mechanism disengagement actuator, via a cable, etc.), and/or the operator may locally disengage the latching mechanism 734 from a position adjacent to the header (e.g., via a release, via a lever, etc.).

In certain embodiments, the locking mechanism may include multiple rods, with each rod coupled to a number of transition arms (e.g., one transition arm, two transition arms, three transition arms, etc.). Each rod may independently rotate. For example, each rod may be coupled to a single transition arm to control movement of a single arm of the header.

Figure 8:
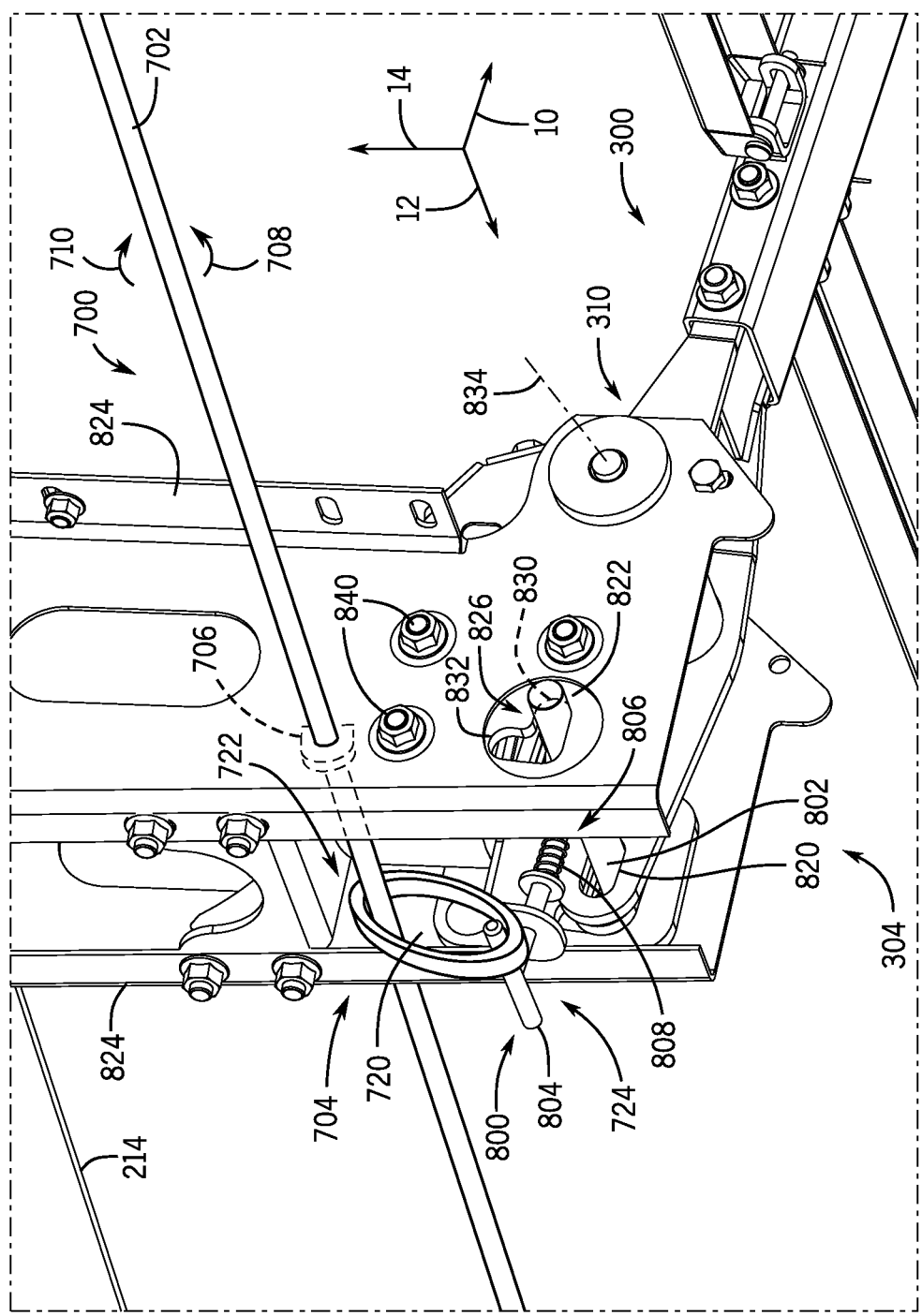
FIG. 8 is a rear perspective view of a portion of the header of FIG. 2, in which the locking mechanism of FIG. 7 is in a locked state, in accordance with an aspect of the present disclosure.

FIG. 8 is a rear perspective view of a portion of the header of FIG. 3, in which the locking mechanism 700 is in the locked state. As illustrated, the locking mechanism 700 is mounted to the frame 214 via the mounting brackets 706. The locking mechanism 700 includes a linkage assembly 800 and a pin 802 at each arm 300. The first end portion 722 of the transition arm 704 is coupled to the rod 702, and the second end portion 724 of the transition arm 704 is engaged with the linkage assembly 800. The linkage assembly 800 includes a link 804 engaged with the transition arm 704, an extension member 806 coupled to the link 804 and extending through the pin 802, and a biasing assembly 808 engaged with the extension member 806 and the pin 802. While only a portion of the biasing assembly 808 and the extension member 806 are shown in FIG. 8, the biasing assembly 808 and the extension member 806 are disposed on both sides of the pin 802, such that the biasing assembly 808 engaged with the extension member 806 is configured to urge the pin 802 toward the first pin position while the linkage assembly 800 is in a first linkage assembly position, as illustrated, and toward the second pin position while the linkage assembly 800 is in a second linkage assembly position.

As illustrated, the pin 802 extends through slots 820 of the arm 300 and is moveable along the slots 820 (e.g., along the longitudinal axis 10). Additionally, the pin 802 extends through plates 822 (e.g., elements) of the locking mechanism 700. The plates 822 are coupled to struts 824 of the frame 214. As illustrated, the pin 802 extends through an opening 826 formed in each plate 822 and extends through each strut 824. Each opening 826 includes a first portion 830 and a second portion 832. As illustrated, the first portion 830 extends substantially along the longitudinal axis 10, and the second portion 832 extends substantially along the vertical axis 14. The first portion 830 is configured to receive the pin 802 while the pin 802 is in the first pin position, as illustrated. In addition, the second portion 832 is configured to receive the pin 802 while the pin 802 is in the second pin position. As illustrated, the first portion 830 of the opening 826 is configured to block movement of the pin about the pivot joint 310 (e.g., about a pivot axis 834 extending along the pivot joint 310), thereby blocking rotation of the arm 300. In addition, the second portion 832 of the opening 826 is configured to enable movement of the pin 802 about the pivot axis 834, thereby enabling rotation of the arm 300. The extent of the second portion 832 about the pivot axis 834 (e.g., the extent of the second portion 832 along the vertical axis 14) may be particularly selected to control the rotational range of motion of the arm 300. For example, in certain embodiments, the second portion may extend above and below the first portion about the pivot axis (e.g., along the vertical axis). Furthermore, while each portion of the plate opening establishes a substantially linear pin path in the illustrated embodiment, in other embodiments, at least one portion of the plate opening may have another suitable shape (e.g., polygonal, curved, etc.). For example, in certain embodiments, the shape of the second portion of the plate opening may substantially correspond to the path of the pin as the arm rotates about the pivot axis.

In the illustrated embodiment, each plate 822 is coupled to the frame 214 via fasteners 840, such as the illustrated bolts/nuts. However, in alternative embodiments, at least one plate may be coupled to the frame via other suitable fastener(s) (e.g., rivet(s), screw(s), etc.), via a welded connection, via an adhesive connection, via another suitable type of connection, or a combination thereof. Furthermore, in certain embodiments, the plate may be coupled to the frame via an integral connection. For example, the plate and the portion of the frame surrounding the plate may be formed from a single piece of material.

With the locking mechanism 700 in the illustrated locked state, the transition arm 704 positions the linkage assembly 800 in the illustrated first linkage assembly position. With the linkage assembly 800 in the first linkage assembly position, the link 804 is positioned closer to the arm 300, thereby compressing a portion (e.g., the first, visible portion) of the biasing assembly 808 coupled to the extension member 806 between the link 804 and the pin 802. The compression of the portion of the biasing assembly 808 between the link 804 and the pin 802 urges the pin 802 toward the first portion 830 of the opening 826, such that the pin 802 moves into the first portion 830 of the opening 826 when the second end portion 304 of the arm 300 moves to a position that aligns the pin 802 with the first portion 830. For example, after the rod 702 and the transition arm 704 are rotated in the first direction 708 to the first orientation, the header may be lowered such that the cutter bar assembly is engaged with a surface (e.g., a ground surface), which may drive the first end portion of the arm 300 upwardly and the second end portion 304 downwardly, thereby aligning the pin 802 within the first portion 830 of the opening 826. Engagement of the pin 802 with the first portion 830 of the opening 826 (e.g., the first pin position) blocks rotation of the arm 300. As a result, the portion of the cutter bar assembly coupled to the first end portion of the arm 300 is substantially rigidly held in place and is blocked from flexing, thereby placing the cutter bar assembly in the substantially rigid configuration.

When the flexible configuration of the cutter bar assembly is desired, the operator may transition the locking mechanism 700 from the illustrated locked state to the unlocked state. The rod 702 and the transition arm 704 may rotate in the second direction 710 to move the linkage assembly 800 to the second linkage assembly position, thereby compressing a portion (e.g., a second portion) of the biasing assembly 808 coupled to the extension member 806 and disposed generally opposite the visible portion of the biasing assembly 808 relative to the pin 802. The compression of the second portion of the biasing assembly 808 urges the pin 802 into the second portion 832 of the opening 826. As such, the header may transition from the substantially rigid configuration of the cutter bar assembly to the substantially flexible configuration of the cutter bar assembly by rotating the rod 702 and the transition arm 704 in the second direction 710 to the second orientation and raising the second end portion 304 of the arm 300 (e.g., by raising the header off a ground surface).

In certain embodiments, the agricultural header may include a combination of the locking mechanism 400 described above with reference to FIGS. 3-6 and the locking mechanism 700 described above with reference to FIGS. 7 and 8. For example, certain arm(s) may be controlled by the locking mechanism 400, and other arm(s) may be controlled by the locking mechanism 700. Furthermore, while the locking mechanisms are configured to control movement of arms of the header in the illustrated embodiments, the locking mechanisms described above may also be used (e.g., individually or in combination) to control movement of end portion(s) of the header (e.g., side deck(s) of the header) and/or an infeed deck of the header.

As described herein, in certain embodiments, a locking mechanism for arms of an agricultural header includes a rod and cams coupled to the rod and configured to engage the arms. The arms may be coupled to a cutter bar assembly of the agricultural header and may be configured to pivot. For example, the rod may rotate in a first direction to drive the cams to engage the arms to transition the locking mechanism to a locked state. In the locked state, cams are engaged with the arms, and the cutter bar assembly is held in a substantially rigid configuration. Additionally, the rod may rotate in a second direction, opposite the first direction, to drive the cams to disengage the arms and to transition the locking mechanism to an unlocked state. In the unlocked state, the cams are disengaged from the arms, and the cutter bar assembly is configured to flex.

In some embodiments, the locking mechanism may include the rod and transition arms (e.g., in addition to or in place of the cams) coupled to the rod and configured to move pins moveably coupled to the arms of the header. For example, the rod and the transition arms may rotate in a first direction to move the pins to a first pin position (e.g., to compress biasing assemblies coupled to the pins, thereby causing the biasing assemblies to move the pins to the first pin position) and to transition the locking mechanism to a locked state. In the locked state, the pins block rotation of the arms, and the cutter bar is held in the substantially rigid configuration. Additionally, the rod and the transition arms may rotate in a second direction, opposite the first direction, to move the pins to a second pin position (e.g., to compress the biasing assemblies coupled to the pins, thereby causing the biasing assemblies to move the pins to the second pin position) and to transition the locking mechanism to an unlocked state. In the unlocked state, the arms of the header are configured to rotate, and the cutter bar assembly is configured to flex.

The transition of the locking mechanism between the unlocked and locked states may enable an operator of the agricultural header to change the cutter bar assembly between a flexible configuration and a substantially rigid configuration, respectively. For example, for some agricultural products and/or for some field conditions, the operator may desire a flexible cutter bar assembly that may generally flex with contours of the field. For other agricultural products and/or for other field conditions, the operator may desire a substantially rigid cutter bar assembly that remains substantially rigid as the agricultural header traverses the field. The locking mechanism enables the operator to easily transition between the flexible and the substantially rigid configurations. The operator may transition the cutter bar assembly between the flexible and the substantially rigid configurations while positioned within a cab of a harvester by controlling rotation of the rod of the locking mechanism and, in certain embodiments, by raising or lowering the agricultural header. As a result, the locking mechanism described herein may increase an efficiency of operating the agricultural header and an efficiency of the harvesting process. The operator may transition the cutter bar assembly between the flexible and substantially rigid configuration without leaving the cab.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A locking mechanism for an agricultural header, comprising:
   a rod configured to extend laterally along the agricultural header; and
   a cam coupled to the rod and configured to engage a respective arm of the agricultural header, wherein the arm is configured to support a cutter bar assembly of the agricultural header, the arm is configured to rotate relative to a frame of the agricultural header, the rod is configured to rotate in a first direction to a first orientation to engage the cam with the arm to block rotation of the arm relative to the frame, the cam is configured to slide along the arm to drive the arm toward a blocked orientation, and the rod is configured to rotate in a second direction, opposite the first direction, to a second orientation to disengage the cam from the arm to enable rotation of the arm relative to the frame.

2. The locking mechanism of claim 1, wherein the cam comprises a curved surface configured to slide along the arm of the agricultural header.

3. The locking mechanism of claim 2, wherein the curved surface comprises:
   an end portion configured to engage the arm while the rod is in the first orientation to block rotation of the arm relative to the frame; and
   a side portion configured to be spaced apart from the arm while the rod is in the second orientation to enable rotation of the arm.

4. The locking mechanism of claim 3, comprising a hydraulic system configured to at least partially control rotation of the arm.

5. The locking mechanism of claim 1, comprising a latching mechanism configured to selectively block rotation of the rod while the rod is in the second orientation.

6. The locking mechanism of claim 1, comprising a motor coupled to the rod, wherein the motor is configured to drive the rod to rotate in at least the second direction.

7. The locking mechanism of claim 1, comprising a second cam coupled to the rod and configured to engage a second respective arm of the agricultural header.

8. The locking mechanism of claim 1, comprising a biasing element configured to urge the rod to rotate in the first direction.

9. The locking mechanism of claim 8, wherein the biasing element comprises at least one spring.

10. A locking mechanism for an agricultural header, comprising:
    a rod configured to extend laterally along the agricultural header; and
    a transition arm coupled to the rod and configured to control movement of a pin movably coupled to a respective arm of the agricultural header, wherein the arm is configured to support a cutter bar assembly of the agricultural header, the arm is configured to rotate relative to a frame of the agricultural header, the pin is moveable between a first pin position and a second pin position, the pin is configured to block rotation of the arm relative to the frame while the pin is in the first pin position, the pin is configured to enable rotation of the arm relative to the frame while the pin is in the second pin position, the rod is configured to rotate in a first direction to move the transition arm in the first direction, such that the transition arm urges the pin toward the first pin position, and the rod is configured to rotate in a second direction, opposite the first direction, to move the transition arm in the second direction, such that the transition arm urges the pin toward the second pin position.

11. The locking mechanism of claim 10, wherein the transition arm has a slot, and the pin extends into the slot.

12. The locking mechanism of claim 10, comprising a linkage assembly coupled to the transition arm and to the pin, wherein movement of the transition arm drives movement of the linkage assembly.

13. The locking mechanism of claim 12, wherein the transition arm comprises:
    a first end portion coupled to the rod; and
    a second end portion engaged with the linkage assembly, wherein the first end portion is disposed generally opposite the first end portion.

14. The locking mechanism of claim 10, wherein the pin is configured to move relative to an element of the agricultural header, the element comprises the respective arm or the frame of the agricultural header, the element has an opening, the opening has a first portion and a second portion, the first portion is configured to receive the pin while the pin is in the first pin position, and the second portion is configured to receive the pin while the pin is in the second pin position.

15. The locking mechanism of claim 10, comprising a second transition arm coupled to the rod and configured to control movement of a second pin movably coupled to a second respective arm of the agricultural header.

16. The locking mechanism of claim 10, comprising a biasing element configured to urge the rod to rotate in the first direction.

17. An agricultural header, comprising:
    a frame;
    an arm pivotally coupled to the frame, wherein the arm is configured to support a cutter bar assembly; and
    a locking mechanism configured to selectively block movement of the arm, wherein the locking mechanism comprises:
       a rod extending laterally along the agricultural header; and
       a cam coupled to the rod and configured to engage the arm, wherein the rod is configured to rotate in a first direction to a first orientation to engage the cam with the arm to block rotation of the arm relative to the frame, the cam is configured to slide along the arm to drive the arm toward a blocked orientation, and the rod is configured to rotate in a second direction, opposite the first direction, to a second orientation to disengage the cam from the arm to enable rotation of the arm relative to the frame.

18. The agricultural header of claim 17, wherein the cam comprises:
    an end portion configured to engage the arm while the rod is in the first orientation to block rotation of the arm relative to the frame; and
    a side portion configured to be spaced apart from the arm while the rod is in the second orientation to enable rotation of the arm.

19. The agricultural header of claim 17, comprising a latching mechanism configured to selectively block rotation of the rod while the rod is in the second orientation.

20. The agricultural header of claim 17, comprising a handle coupled to the rod, wherein the handle enables a user to rotate the rod in the first direction and in the second direction.

* * * * *